(12) United States Patent
D'Acquisto (10) Patent No.: US 10,687,524 B2
(45) Date of Patent: Jun. 23, 2020

(54) CAMOUFLAGE FOR ARCHERY EQUIPMENT AND ACCESSORIES

(71) Applicant: Andrae T. D'Acquisto, Bellevue, IA (US)

(72) Inventor: Andrae T. D'Acquisto, Bellevue, IA (US)

( * ) Notice: Subject to any disclaimer, the term of this patent is extended or adjusted under 35 U.S.C. 154(b) by 0 days.

(21) Appl. No.: 16/243,727

(22) Filed: Jan. 9, 2019

(65) Prior Publication Data

US 2019/0212637 A1 Jul. 11, 2019

Related U.S. Application Data

(60) Provisional application No. 62/615,417, filed on Jan. 9, 2018, provisional application No. 62/615,423, filed on Jan. 9, 2018.

(51) Int. Cl.
| | |
|---|---|
| *A01M 31/00* | (2006.01) |
| *F16M 13/02* | (2006.01) |
| *F16C 11/06* | (2006.01) |
| *G03B 17/56* | (2006.01) |
| *A01K 29/00* | (2006.01) |
| *H04N 5/225* | (2006.01) |
| *F41H 3/00* | (2006.01) |

(52) U.S. Cl.
CPC ......... *A01M 31/002* (2013.01); *A01K 29/005* (2013.01); *F16C 11/06* (2013.01); *F16M 13/02* (2013.01); *F41H 3/00* (2013.01); *G03B 17/56* (2013.01); *G03B 17/561* (2013.01); *H04N 5/2251* (2013.01); *H04N 5/2253* (2013.01)

(58) Field of Classification Search
CPC .......................... A01M 31/002; A01K 29/005
See application file for complete search history.

(56) References Cited

U.S. PATENT DOCUMENTS

| | | | | |
|---|---|---|---|---|
| 5,677,017 | A * | 10/1997 | Freeman | F41H 3/00 428/17 |
| 6,033,608 | A * | 3/2000 | Reynolds | B29C 44/14 264/257 |
| 9,075,292 | B1 * | 7/2015 | Brown | G03B 17/56 |
| 2011/0186100 | A1 * | 8/2011 | Bolin | B29C 44/02 135/121 |
| 2014/0209138 | A1 * | 7/2014 | Thomason | B29C 33/3857 135/117 |
| 2015/0004335 | A1 * | 1/2015 | Parr | F41H 3/00 428/30 |
| 2015/0022717 | A1 * | 1/2015 | Coons | E05C 19/14 348/373 |

* cited by examiner

*Primary Examiner* — Clayton E. LaBalle
*Assistant Examiner* — Dennis Hancock
(74) *Attorney, Agent, or Firm* — Ryan Kromholz & Manion, S.C.

(57) ABSTRACT

A camera camouflage may include a camera skin. The camera skin may include a panel to cover a front face of the camera. The panel has an inner face to face the camera and an outer face. The outer face may include an irregular pattern of grooves simulating grooves of a tree bark and an opening to be aligned with a lens of a camera when the skin is coupled to the camera.
A camouflage pattern as disclosed can be used as a covering for assorted hunting equipment, such as camouflage adhesive tape, camouflage wrap, camouflage bow riser opening inserts, and other hunting related accessories.

33 Claims, 9 Drawing Sheets

Support in the specification is found at Fig. 29 of the Specification:

CAMOUFLAGE FOR ARCHERY EQUIPMENT AND ACCESSORIES

RELATED APPLICATIONS

This application claims the benefit of U.S. Provisional Patent Application Ser. No. 62/615,423, filed 9 Jan. 2018 and U.S. Provisional Patent Application Ser. No. 62/615,417, filed 9 Jan. 2018.

BACKGROUND OF THE INVENTION

Cameras are sometimes used for wildlife observation. Such cameras are often mounted to trees for capturing video or images of wildlife.

Other archery or hunting equipment or related accessories, such as tree stands, climbing sticks, bows, arrows, quivers, boxes, and other gear can benefit from camouflaging for improved concealment.

SUMMARY OF THE INVENTION

The invention comprises systems and methods for camouflaging outdoor equipment, such as hunting equipment, cameras, archery equipment and the like. Skins can be provided for trail camera mounts using novel camouflaging systems disclosed herein. The camouflaging systems of the present invention can be used for silencing hunting equipment with improved three-dimensional noise absorption, and used on appliques such as adhesive tape, inserts to place within bow risers, or wrapping structure.

In some embodiments, jointed patterns disclosed travel across a surface, and tie in to one another. In other embodiments, jointed patterns dead end, so that joints do not traverse across an entirety of a surface. In other embodiments, individual islands of pattern mimic a bark pattern, and individual islands can comprise different shapes and sizes to mimic big islands, small islands, or whatever camouflaging pattern is desirable for blending against the environment.

In one embodiment, a wrap fabric, or a wrap tape or adhesively equipped wrap is disclosed. Such a wrap can be installed on a variety of outdoor use products. As the three dimensional camouflage is applied, curves on the structure that the three dimensional camouflage is installed upon causes joints in the three dimensional camouflage to open, causing a realistic shadow throw. For instance, in low light conditions, a realistic deep shadow throw is possible due to the depth of three dimensional camouflage that is not possible with two dimensional printed camouflage.

In other embodiments, a side pattern of a three dimensional camouflage matches an adjoining piece of three dimensional camouflage such that two adjoining pieces form a continuous pattern, such that quarry could not discern breaks in a continuous appearing pattern.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
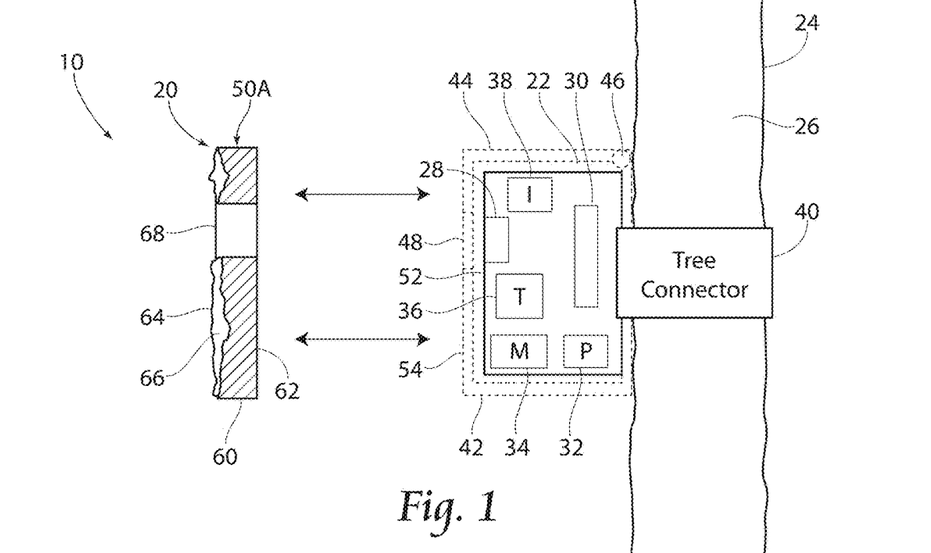
FIG. 1 is an exploded side view of an example camouflaged camera system with portions schematically shown in with portions shown in section.

FIG. 1 is a schematic diagram illustrating an example camera camouflage 20 as part of a larger camouflaged camera system 10. Camouflage 20 conceals a camera 22 mounted or otherwise supported alongside a tree 24 having a bark 26 on its exterior trunk. Camera 22 comprises a device configured to capture video and/or images of wildlife in areas about the tree 24. As schematically illustrated, camera 22 comprises a digital camera comprising a lens 28 which focuses light on to an optical sensor 30. Although not illustrated, camera 22 may include additional lenses and mirrors for guiding light from lens 28 to optical sensor 30.

Camera 22 further comprises a processor 32 that receives signals from the optical sensor 30 and stores the captured video or images on a memory 34. The captured images or video may be further transmitted to a remote device via a transceiver 36. In some implementations, camera 22 may be controlled via signals transmitted to and received by transceiver 36 of camera 22. In some implementations, camera 22 may alternatively or additionally be controlled via selections or commands entered via a user input 38. Input 38 may comprise a slide bar, a touchscreen, at least one button, switch or the like. In some implementation, input 38 may be omitted. In some implementations, camera 22 may comprise a non-digital camera, and analog camera to capture the video or images in a timed manner.

In one implementation, camera 22 is mounted directly to tree 24 by a tree connector 40. Tree connector 40, schematically illustrated, may comprise a strap that wraps about tree 26, a securing bracket or other mounting mechanisms. In other implementations, as illustrated by broken lines, camera 22 may be received within an outer housing, frame, box, container, enclosure bracket or other structure 42 that removably receives camera 22 and that is, itself, mounted to tree 24 by tree connector 40. In such an implementation, the camera 22 may be removed from structure 42. For example, in one implementation, structure 42 may comprise a door, lid or cover 44 that may be removed and separated from structure 42 or which is openable via a hinge 46 to allow access to the interior of structure 42. As shown by FIG. 1, structure 42 may comprise a window or an opening 48 that aligns with lens 28 and camera 22 is received within structure 42, such that light may pass through the window 48 and through the lens 28 to the optical sensor 30.

Camera camouflage 20 comprises at least one camera skin 50A (shown in section) which is removably mountable and supportable in front of camera 22. In one example where structure 42 is omitted and where camera 22 is mounted directly to tree 24, each camera skin is removably mountable to a front face 52 of camera 22. In other examples where camera 22 is received within structure 42, each camera skin 50A is removably mountable to a front face 54 of structure 42. In those examples where camera camouflage 20 comprise multiple interchangeable skins 50, the skins 50, collectively, form a kit, facilitating adaptation of camera 22 or structure 42 for use with different trees 24 which may have different barks 26. Alternatively, interchangeable skins 50 can comprise different colors for different seasons (e.g., white and/or tan for winter, green for spring, and tan and/or red/orange/green for fall).

As shown by FIG. 1, camera skin 50A comprises a panel 60 that is sized or dimensioned to cover at least a front face of camera 22, directly such as when structure 42 is omitted or indirectly such as when camera 22 is received within structure 42. Panel 60 has an interface 62 that is to face camera 22 (or structure 42) and an opposite outer face 64. Outer face 64 comprises an irregular pattern of grooves 66 which stimulate grooves of tree bark 26.

For purposes of this disclosure, the term "irregular" with respect to a pattern means that the layout or arrangement of grooves is inconsistent or nonuniform in at least one respect across the outer surface. For example, the shape of the individual grooves may be identical, but wherein all of the grooves are not perfectly parallel or consistently perpendicular to one another. For example, some grooves may branch off from other grooves at different oblique angles. Some grooves although "generally" parallel to one another, may irregularly wind in different and irregular serpentine fashions along one another, meaning that there is no consistency between the winding or serpentine path of the different grooves.

In addition or alternatively, the "irregular pattern of grooves" may further or alternatively refer to the individual grooves being different with respect to one another. For example, different grooves may have different widths, different depths, different nonuniform depth profiles, differently shaped or angled interior side walls, differently shaped, differently textured and/or differently contoured floors. Groups of grooves may have different spacings or centerline-to-centerline pitches. In some implementations, grooves may branch off from one another at different oblique angles. In some implementations, the texture of the surfaces between the grooves may have different textures. In some implementations, the "irregular pattern of grooves" may comprise a combination of at least two of the above described groove or pattern characteristics that may vary from one another. The irregular nature of the "pattern" of grooves more effectively simulates the real or natural bark 26 of a tree so as to be less conspicuous to wildlife or other objects being captured by camera 22.

Panel 60 further comprises an opening 68 that is located such that it is aligned with lens 28 (and window or opening 48 when structure 42 is employed) when skin 50A is coupled to camera 22 while substantially extending across a front area of camera 22 (directly or indirectly as noted above). In one implementation, opening 60 may be located within an individual groove 66, such as through the floor of an individual groove 66. In such an implementation, the lens 28 may be partially concealed by being recessed within the groove 66.

In one implementation, camera skin 50A is removably adhered directly to the front face 52 of camera 22 or indirectly to the front face 54 of structure 42 by various mounting mechanisms. Examples of such mounting mechanisms include, but are not limited to, suction cups extending from inner face 62 of skin 50A or extending from front face 52 or front face 54, releasable adhesive, such as releasable adhesive tape joining inner face 62 to front face 52 or front face 54, resiliently flexible hooks or clips formed on one of skin 50A and structure 42/camera 22 that hook onto corresponding detents, bars, pins or the like provide on the other of skin 50A and structure 42/camera 22. In some implementations, such hooks or clips may pivot between a locking and releasing state, such as using an over-center cam mechanism. In yet other implementations, skin 50A may be releasably secured to camera 22/structure 42 by screws, bolts or fasteners that extend through or from skin 50A into camera 22 or structure 42. In yet other implementations, skin 50A may be removably mounted to camera 22/structure 42 by a strap that wraps about camera 22 or about structure 42, or that wraps about tree 24. In some implementations, skin 50A may releasably mount to tree connector 40.

In other implementations, skin 50A may be permanently fixed to camera 22 or to structure 42. For example, skin 50A may be fixedly welded, bonded, riveted or otherwise secured to camera 22 or to structure 42. In some implementations, skin 50A may be integrally formed as a single unitary body with structure 42 or the exterior of camera 22. For example, in one implementation, skin 50A may comprise a material that is over molded about the exterior of camera 22 or about the exterior of structure 42.

In one implementation, skin 50A comprises a single layer of a rubber or rubber-like material, providing compressibility and resilient stretchability. In one implementation, skin 50A may wrap about opposite faces, such as about top and bottom or opposite sides of camera 22 or structure 42, readying skin 50A to be peeled off of camera 22 or structure 42 for replacement or repair. In other implementations, skin 50A may be formed from a polymer. In some implementations skin 50A may be formed from multiple layers of laminate otherwise secured to one another.

Figure 2:
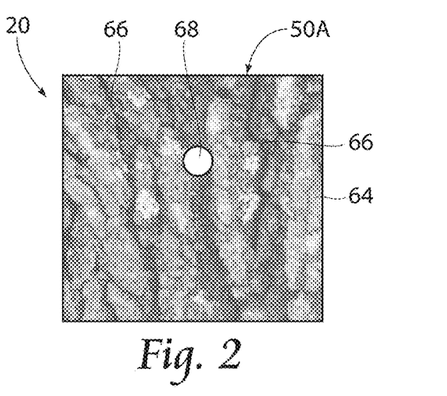
FIG. 2 is a front view of portions of an example camera skin of the system of FIG. 1.

FIG. 2 is a front view of a portion of outer face 64 of skin 50A. As shown by FIG. 2, outer face 64 of skin 50A has a color and an irregular pattern of grooves 66 that simulates or closely matches the color and irregular pattern or grooves of bark 26. As a result, the structure 42 and/or camera 22 is less conspicuous when mounted along the trunk of tree 24, enhancing the effectiveness of camera 22 with respect to the capture of video or images of wildlife or other objects being observed.

Figure 3:
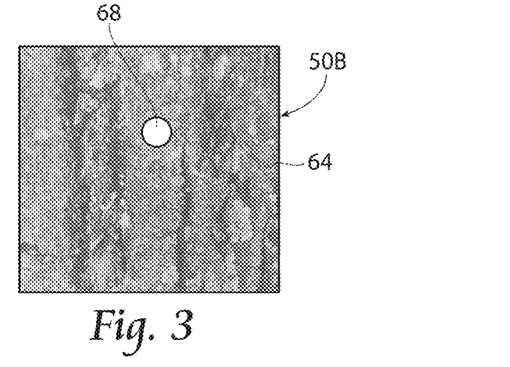
FIG. 3 is a front view of portions of another example camera skin that may be interchanged with the camera skin of FIG. 1, forming an example kit.
Figure 4:
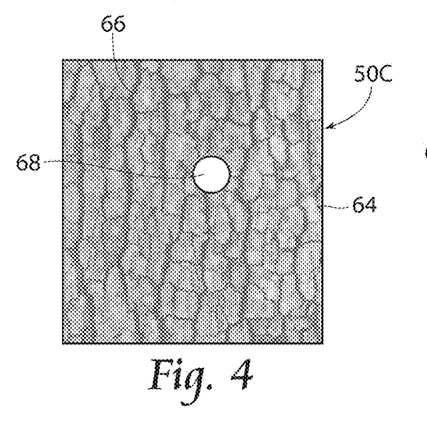
FIG. 4 is a front view of portions of another example camera skin that may be interchanged with the camera skin of FIG. 1, forming an example kit.
Figure 5:
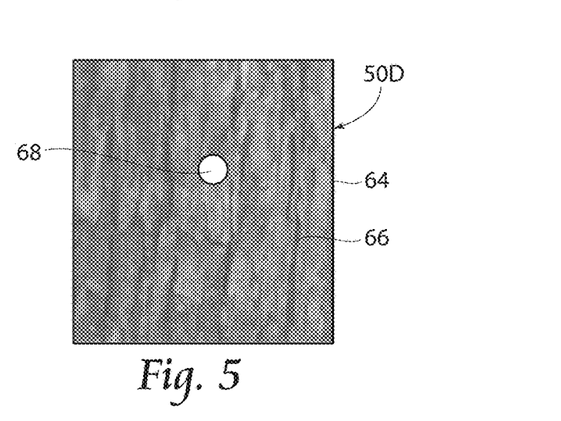
FIG. 5 is a front view of portions of another example camera skin that may be interchanged with the camera skin of FIG. 1, forming an example kit.

FIGS. 3-5 are front s illustrating other example camera skins 50B, 50C and 50D which are each interchangeable with camera skin 50A (when camera skin 50A is removable Mirth respect to structure 42 and/or camera 22). Each of camera skins 50B-50D includes die same components as camera skin 50A described above with respect to FIG. 1 except that each of such skins has a different outer surface 64. Each of camera skins 50B-50D may have different colors, patterns and groove configurations as compared to camera skin 50A. As a result, camera skins 50A-50D, forming a kit, may be interchanged to best match the characteristics of bark 26 of the particular tree 24 to which camera 22 and/or structure 42 is mounted, or to best match the seasons (summer, fall, winter and spring) when the skins 50A-50D are employed. In the example illustrated, camera skin 50A best matches the characteristics of bark 26. When system 10 is utilized with other trees having different barks 26, one of camera skins 50B 50D may better match the bark characteristics of the particular tree, or the seasons in use as desired.

Figure 6:
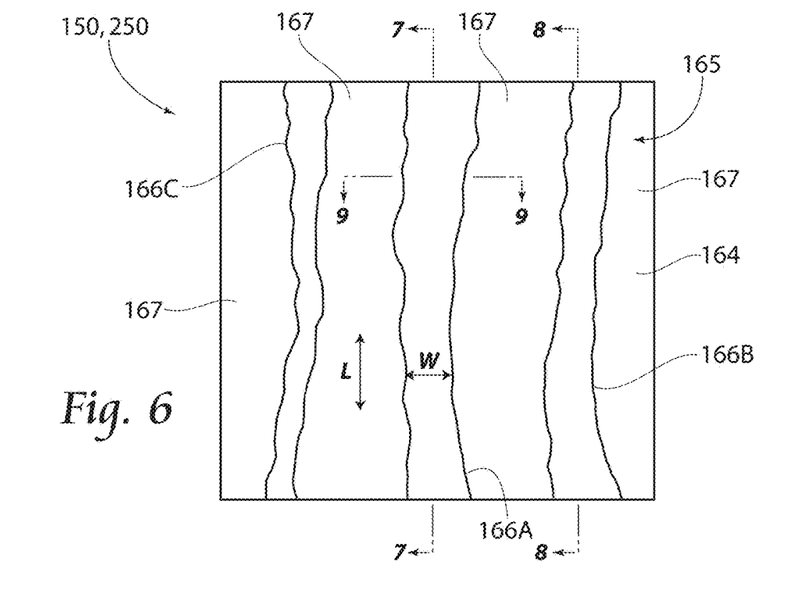
FIG. 6 is a front view of portions of another example camera skin that may be utilized as part of the system of FIG. 1.

FIGS. 6-9 illustrates portions of an example camera skin 150 for use with camera 22 (and structure 42 when provided) when camera 22 is mounted to a tree 24 by a tree connector 40. In one implementation, camera skin 150 is interchangeable with camera skin 50A. As with camera skins 50A-50D, camera skin 150 has an outer surface 164 having an irregular pattern 165 of grooves 166A, 166B and 166C (collectively referred to as grooves 166. As shown by FIG. 6, grooves 166A and 166B each have a varying width W along its length L. Grooves 166A has a different average width, a different maximum width in a different minimum with as compared to groove 166B. Each of grooves 166 extends in a non-parallel fashion along skin 150, having winding or wavy sides that wind or wave in an inconsistent an irregular manner along the length L and with respect to the sides of other of grooves 166. Grooves 166 further have different centerline-to-centerline pitches or spacings such that the intermediate top surfaces 167 between consecutive grooves 166 have different surface areas.

Figure 7:
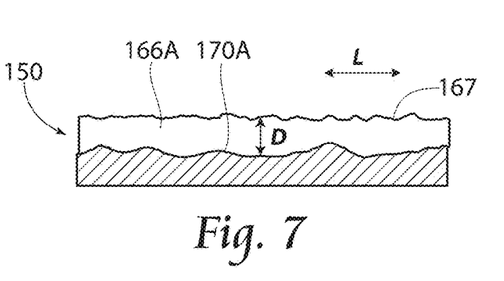
FIG. 7 is a sectional view of the camera skin of FIG. 6 taken along line 7-7.
Figure 8:
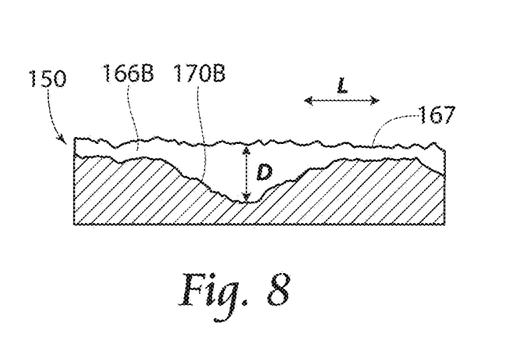
FIG. 8 is a sectional view of the camera skin of FIG. 6 taken along line 8-8.

FIGS. 7 and 8 illustrate the differing depth profiles of grooves 166A and 166B, respectively. As shown by FIGS. 7 and 8, grooves 166A and 166B have different floors 170A and 170B, respectively. Floors 170A and 170B rise and fall in inconsistent manners along length L and with respect to one another. Floors 170A and 170B are not flat and extended different inclines or declines with respect to one another in along length L. Alternatively, floors 170A and 170B may be flat, or may alternate between flat and not flat portions. Floors 170A and 170B can have different average depths, different minimum depths and different maximum depths with respect to one another. In one implementation, grooves 166A and 166B each have a depth of at least ⅛ of an inch such that the respective floors are least ⅛ of an inch from a top of the groove, surface 167, in at least one location along length L. In one implementation, such grooves have an average depth of at least ⅛ of an inch along length L. In one implementation, such grooves each have a depth of at least one ¼ of an inch at least one location along length L. In one implementation, such grooves have an average depth of at least ¼ of an inch along length L. The irregularity of the depth and floors 170 of grooves 166 may better simulate natural occurring bark, rendering skin 150 and the camera 22 or its structure 42 behind skin 150 less conspicuous. Assisting in this camouflaging is the advantageous result of the different depth profiles casting irregular shadows. In other implementations, grooves 166A and 166B may have a single depth along length L or may have similar depth profiles with respect to one another.

In one implementation, surfaces 167 have a different color as compared to floors 170 of the grooves 166. For example, in one implementation, the floors 170 may be provided with a darker color or tone as compared to surfaces 167. In one implementation, surface 167 may have a tan, brown or green color while floors 170 have a dark brown or black color. This color contrast may better simulate natural bark 26 to render skin 150 and the camera 22, or structure 42, being concealed less conspicuous.

In other embodiments, a series of skins 150 is provided with varying color or structural patterns and stylings. For instance, a summer or early season skin can be provided with green color, a fall seasonal skin can be provided with tan, orange, red, or a combination of other fall colors, and a late season or winter skin could be provided with white, tan or a combination of other winter seasonal colors.

Figure 9:
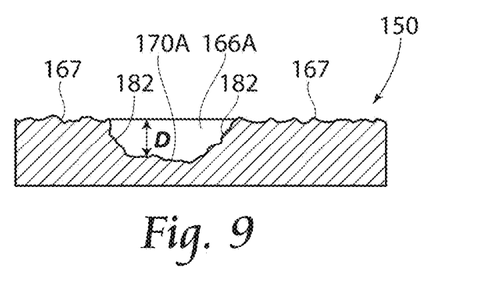
FIG. 9 is a sectional view of the camera skin of FIG. 6 taken along line 9-9.

FIG. 9 illustrates a cross-sectional view of groove 166A. As shown by FIG. 9, groove 166A has opposing interior sidewalls 182 that face one another and that are oblique with respect to floor 170A and top surface 167. In one implementation, interior sidewalls 182 further extend at different oblique angles with respect to floor 170A and top surface 167. In the example illustrated, interior sidewalls 182 have different textures or references in addition to different sloping inclines or declines. As such, groove 166A is less consistent and more irregular, better simulating a natural tree bark 26 such that skin 150 renders camera 22 or its enclosing structure 42 less conspicuous.

In other implementations, sidewalls 182 can be vertical, and in some instances it has been found that vertical walls, in addition to in instead of the previously described eccentrically shaped walls, serve to cast better shadows.

Figure 10:
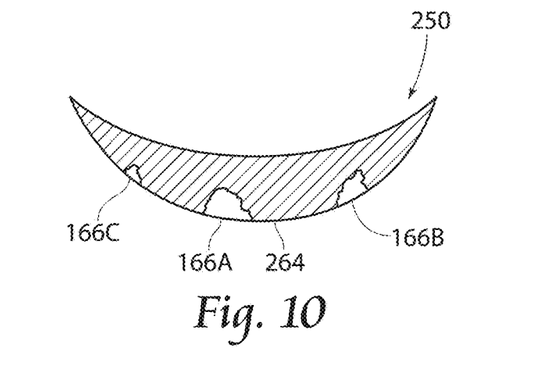
FIG. 10 is a sectional view of portions of another example camera skin.

FIG. 10 is a sectional view of another example skin 250 taken along an exemplary line 9-9 of FIG. 6. Skin 250 has an outer face 264 which has a convex curvature, better corresponding to the outer convex curvature of tree 24. As further shown by FIG. 10, skin 250 comprises an irregular pattern of grooves 166A, 166B and 166C as described above.

FIGS. 11-18 are sectional views (taken through a horizontal plane, one that extends parallel to the ground or perpendicular to the centerline of the tree) of various example camera skins releasably or fixedly mounted to or in front of an example camera 22 (shown in broken lines). It should be appreciated that such camera skins may alternatively be mounted in a similar to fashion to a structure 42 (as described above) that itself at least partially receives camera 22. For example, the illustrated periphery of each of the cameras 22 may alternatively comprise the periphery of structure 42.

Figure 11:
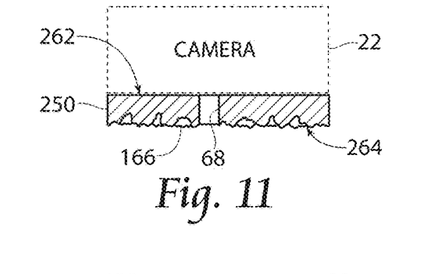
FIG. 11 is a sectional view of another example camera skin.

FIG. 11 illustrates an example camera skin 250. Camera skin 250 is similar to camera skins 50 and 150 described above. In the example illustrated, camera skin 250 mounts to the front face of the object being concealed, namely, camera 22, or in another implementation, the front face of structure 42. In the example illustrated, skin 250 has an inner face 262 and an outer face 264 which have parallel and substantially planar profiles. Inner surface 262 has a profile that matches and mates with the front face profile of camera 22 (or structure 42). Although having a substantially flat or planar profile, outer face 264 comprises the irregular pattern of grooves 266 which may comprise an irregular pattern of grooves similar to that shown in FIGS. 1-8. In the example illustrated, outer face 264 comprises an irregular pattern of grooves 166.

Figure 12:
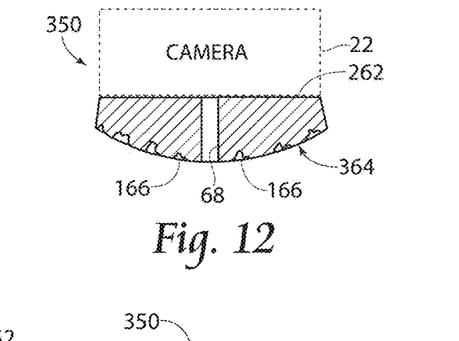
FIG. 12 is a sectional view of another example camera skin.

FIG. 12 illustrates an example camera skin 350. Camera skin 350 is similar to camera skins 50 and 150 described above. Camera skin 350 is similar to camera skin 250 except that camera skin 350 has an outer surface 364 having a curved convex profile. The curved convex profile may be less conspicuous with respect to the also curved convex profile of the tree. In the example illustrated, camera skin 350 mounts to the front face of the object being concealed, namely, camera 22, or in another implementation, the front face of structure 42. Inner surface 262 has a profile that matches and mates with the front face profile of camera 22 (or structure 42). Although having a substantially curved convex profile, outer face 364 comprises the irregular pattern of grooves 166 which may comprise an irregular pattern of grooves similar to that shown in FIGS. 1-8. In the example illustrated, outer face 364 comprises an irregular pattern of grooves 166.

Figure 13:
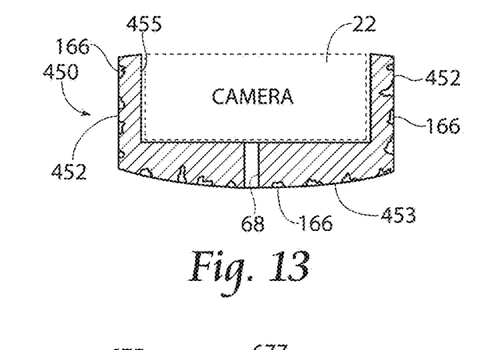
FIG. 13 is a sectional view of another example camera skin.

FIG. 13 illustrates an example camera skin 450. Camera skin 450 is similar to camera skin 350 except that camera skin 450 further comprises sidewalls 452 which together with the front wall 453 form an interior cavity 455 sized, shaped and dimensioned to receive camera 22 (and structure 42 when provided). In the example illustrated, interior cavity 455 is sized and shaped such that skin 450 contacts, abuts and automatically locates camera 22 (or structure 42) within cavity 455 with lens 28 (shown in 1) automatically aligned with openings 68 of skin 450. In other implementations, inner surfaces of cavity 455 may be larger than camera 22, wherein other structures are provided for aligning lens 28 of camera 22 with openings 68.

As further shown by FIG. 13, the outer surface of sidewalls 45 to further comprise a continuation of the irregular pattern of grooves 166. In other implementations, the outer surface of sidewalls 452 may omit such grooves 166. In some implementations, such sidewalls 452 may further wrap about a back surface of camera 22 (or structure 42) to facilitate securement of skin 450 to camera 22 (or structure 42).

Figure 14:
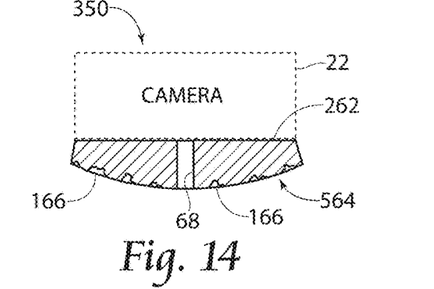
FIG. 14 is a sectional view of another example camera skin.

FIG. 14 illustrates an example camera skin 550. Camera skin 550 is similar to camera skin 350 except that camera skin 550 has an outer face 564. Outer face 564 is similar to outer face 364 except that outer face 564 as a different convex curved profile, a convex profile having a different radius. In one implementation, skin 550 may be interchanged with skin 350 based upon the size or curvature of the tree to which camera 22 is to be mounted. As a result, profile or curvature of the outer surface of the skin 350, 550 may be selected to best match the outer curvature of the tree such that the camera 22 (or structure 42) is less conspicuous.

Figure 15:
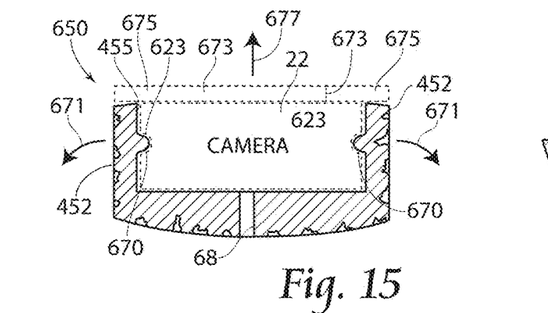
FIG. 15 is a sectional view of another example camera skin.

FIG. 15 illustrates an example camera skin 650. Skin 650 is similar to skin 450 described above except that skin 650 releasably locks to camera 22 (or structure 42). In the example illustrated, camera 22 comprises detents 623 which receive corresponding projections or protuberances 670 to retain skin 650 on in about camera 22 (or structure 42). When skin 650 is to be removed for replacement or when not being utilized, sidewalls 452 may be resiliently flexed or bent (such as when at least portions of skin 650 are formed from a rubber or rubber-like material) in the direction indicated by arrow 671 to withdraw protuberances 670 from detents 623, allowing skin 650 to be lifted away and separated from camera 22. In other implementations, the relationship between the detents and protuberances may be reversed, such as where camera 22 provides protuberances 670 and where skin 650 has interior corresponding detents 623. The mating protuberances and detents are located in sized such that camera 22 is automatically located within cavity 455 with its lens 28 (shown in FIG. 1) aligned with openings 68.

As shown by broken lines in FIG. 15, in some implementations, skin 650 may at least partially wrap along a backside of camera 22 (or structure 42) that extend along both a front and rear sides of camera 22 (or structure 42) to retain the camera 22 (or structure 42) in place. In one implementation, skin 650 completely surrounds the front and rear sides of camera 22 (or structure 42), such as where camera 22 (or structure 42) is inserted into the skin 650 through a top, bottom or side opening. In other implementations, as shown by broken lines 673, skin 650 may partially extend along a rear side of camera 22 (or structure 42), forming rear extension 675 which terminate at edges 673. In such an implementation, sidewalls 452 and the rear extensions 675 may be resiliently flexed in the direction indicated by arrows 671 to a sufficient extent such that rear extensions 675 are no longer behind the rear of camera 22, allowing camera 22 to be rearwardly withdrawn in the direction indicated by arrow 677 from cavity 455.

Figure 16:
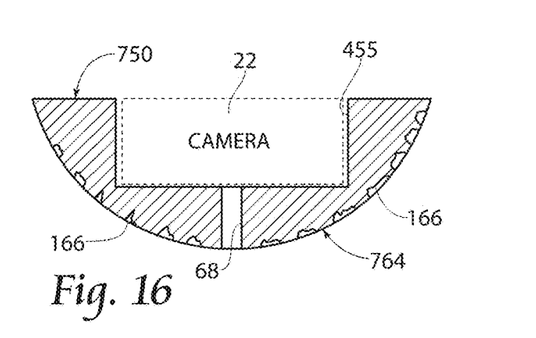
FIG. 16 is a sectional view of another example camera skin.

FIG. 16 illustrates an example camera skin 750. Camera skin 750 similar to camera skin 450 except that camera skin 750 as a convex curved outer face 764 that not only extend along a front of camera 22 (structure 42) but also extends along the sides of camera 22 (structure 42). As a result, skin some 50 has no flat sides. As a result, camera skin some 50 may be less conspicuous with respect to the curved outer sides of the tree to which skin 750 and camera 22 are mounted. In some implementations, skin 750 may be similar to skin 650 in that skin 750 may be configured to releasably lock to the received camera 22 through the use of detents 623 and protuberances illustrates an example camera skin 850 670 as described above and/or through the use of rear extensions 675 as described above. In yet other implementations, skin 750 may completely surround camera 22, wherein camera 22 (or structure 42) is received through a top, bottom or rear opening, the opening being left open or covered by a removable or pivotable door panel.

Figure 17:
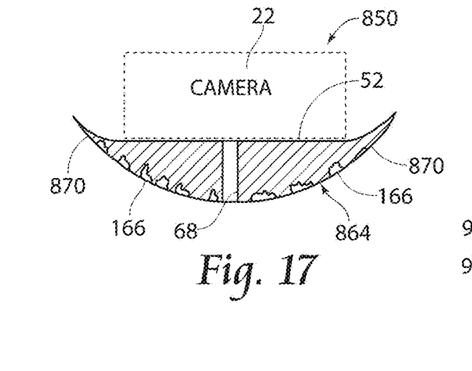
FIG. 17 is a sectional view of another example camera skin.

FIG. 17 illustrates an example camera skin 850. Camera skin 850 is similar to camera skin 350 except that camera skin 850 comprises outer face 864 which includes wingtips 870. Wingtips 870 extend rearwardly of front face 52 of camera 22 (or rearwardly of front face 54 structure 42) so as to partially overlap and conceal sides of camera 22 (or structure 42). At the same time, wingtips 870 continue the curved convex profile of outer face 864 to render skin 850 less conspicuous with respect to the rounded or curved outer profile of the tree to which camera 22 and skin 850 are mounted.

Figure 18:
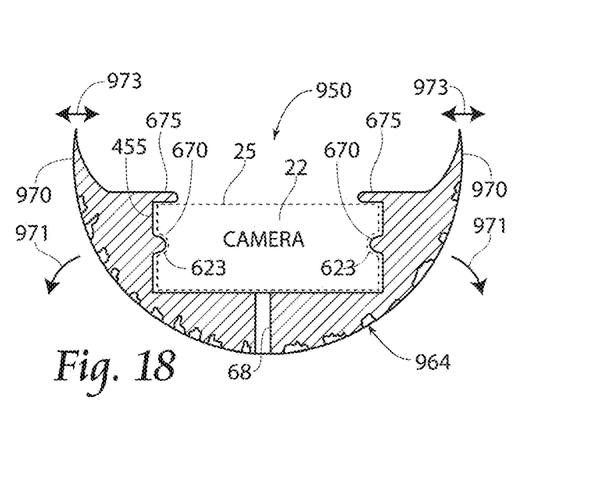
FIG. 18 is a sectional view of another example camera skin.

FIG. 18 illustrates an example camera skin 950. Camera skin 950 incorporates features from each of skins 650 and 750. Similar to camera skin 650, camera skin 950 comprises protuberances 670 which are releasably received within corresponding detents 623 and camera 22 to assist in locating and retaining camera 22 within cavity 455. As discussed above, skin 950 may alternatively comprise detents that receive projections from camera 22. In the example illustrated, camera skin 950 further comprise a rearward extension 675 which extend behind a rear 25 of camera 22, further assisting in retaining and locating camera 22 in place. As discussed above, in one implementation, at least portions of skin 950 may be formed from a sufficiently resilient flexible rubber a rubber-like material that allows the sides of skin 950 to be bent or resiliently flexed in directions indicated by arrows 971 to a sufficient extent so as to withdraw protuberances 670 from detents 623 and so as to further withdraw rear extension 675 out from behind surface 25 of camera 22, permitting camera 22 to be withdrawn from cavity 455.

Similar to camera skin 750, the outer face 964 of camera skin 950 as a curved convex profile that continues about the sides of camera 22 (or structure 42). However, unlike with camera skin 750, outer face 964 of camera skin 950 continue to extend behind rear 25 of camera 22, forming wingtips 970. Wingtips 970 project behind rear 25 of camera 22, continuing the curved convex profile of outer surface 964 into a blended relationship with the size of the tree 24 to which camera 22 and skin 950 are mounted. In one implementation, wingtips 970 are themselves resiliently flexible, for from a rubber or rubber-like material, allowing wingtips 970 resiliently flex inwardly and outwardly as indicated by arrows 973 to accommodate differently sized trees and to grip against sides of the tree. As a result, skin 950 may be even less conspicuous with respect to the tree to which skin 950 is mounted.

Figures 19, 20, 21:
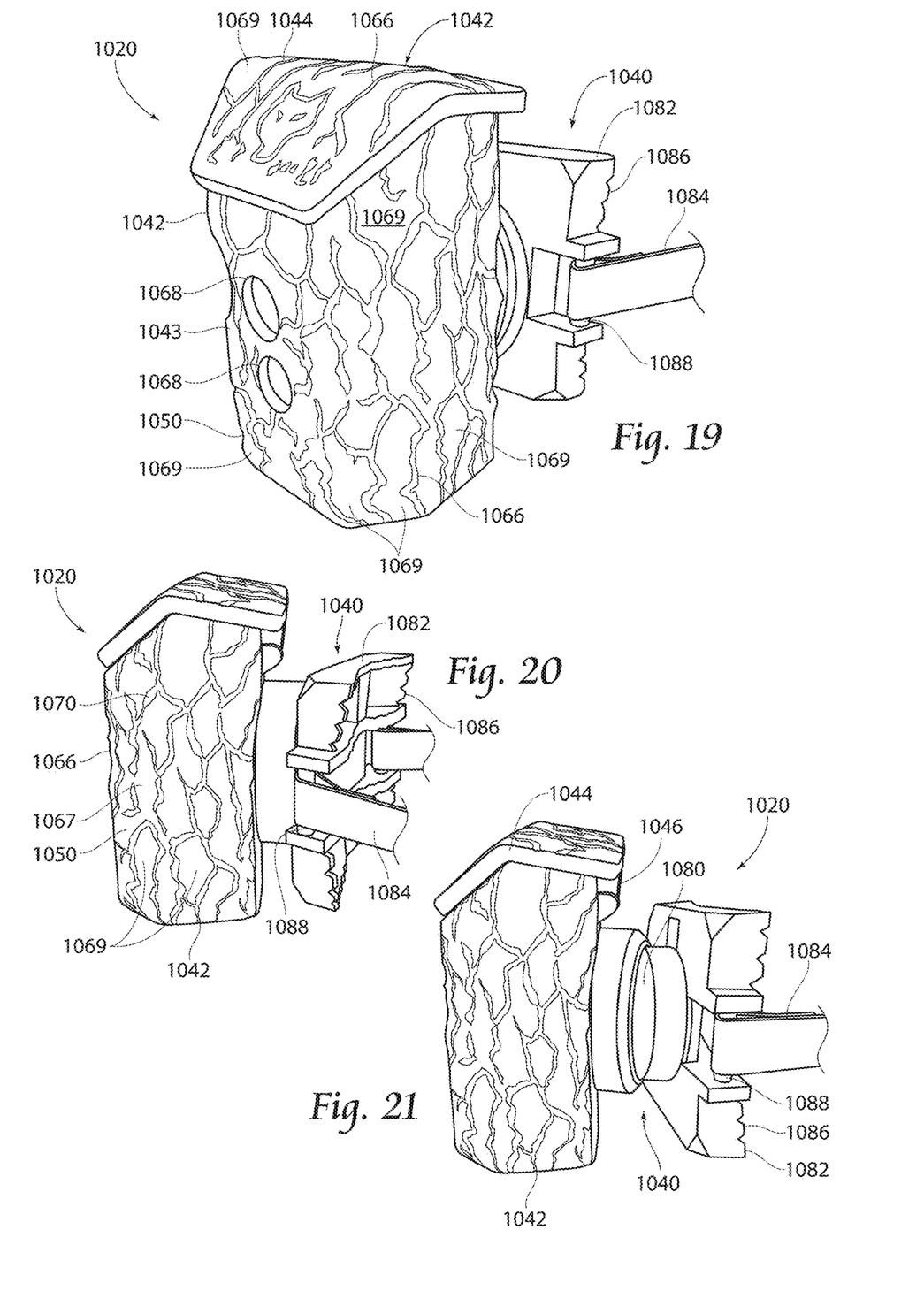
FIG. 19 is a front perspective view of an example camera camouflaging system having a camera skin provided as part of a camera enclosing structure.
FIG. 20 is a first side perspective view of the example camera camouflaging system of FIG. 19.
FIG. 21 is a rear perspective view of the example camera camouflaging system of FIG. 19.

FIGS. 19-21 illustrate an example camera camouflage 1020. Camera camouflage 1020 comprises a camera skin 1050 which is integrally formed as a single unitary body with or as part of a camera enclosing or retaining structure 1042. Camera skin 1050 forms an exterior of structure 1042.

As shown by FIGS. 19-21, structure 1042 forms a box having a rounded or polygonal front face 1043 which receives a camera. Structure 1042 comprises a lid or cover 1044 which pivots about a hinge 1046. Cover 1044 may be pivoted to allow insertion of camera into the interior of structure 1042.

In the example illustrated, camera camouflage 1020 further comprises a tree connector 1040 in the form of a ball and socket joint 1080, a tree gripping claw 1082 and a retention strap 1084. Ball and socket joint 1080 is connected to a rear of structure 1042, facilitating pivotal movement of structure 1042 to different angles. Tree gripping claw 1082 comprises teeth 1086 for gripping against the sides of the tree. Retention strap 1084 is secured to opposite posts 1088 of claw 1082 and wraps about the tree. In one implementation, retention strap 1084 may comprise a buckle for an adjustable length. In one implementation, strap 1084 may comprise two segments which are releasably connected to one another by a side release buckle or other similar connector.

Camera skin 1050 is similar to camera skins 150, 250 described above. Camera skin 1050 extends along the front, sides and across lid 1044 of structure 1042. Camera skin 1050 comprises an irregular pattern of grooves 1066. Grooves 1066 obliquely branch off from one another to provide skin 1050 with a scale-like appearance, forming plates, islands, or scales 1069 which are separated by grooves 1066, and simulating tree bark. In the example illustrated, grooves 1066 and may have varying depths, varying widths and varying sidewalls as described above with respect to FIGS. 6-10. In the example illustrated, skin 1050 comprises outer surfaces 1067 which have a different color as compared to floors 1070 of grooves 1066. In particular, the floors 1070 have a darker color, such as black or dark brown as compared to the lighter colored (tan, gray, green or light brown) exterior top surfaces 1067.

As shown by FIG. 19, skin 1050 can comprise a pair of openings 1068. Openings 1068 are located so as to extend through the walls of skin 1050 and a structure 1042 in line with the lens 28 of the camera 22 (shown in FIG. 1) which is received within structure 1042. In one implementation, camera 22 may comprise a pair of lenses 28, wherein openings 1068 are aligned with the pair of lenses 28.

Figure 22:
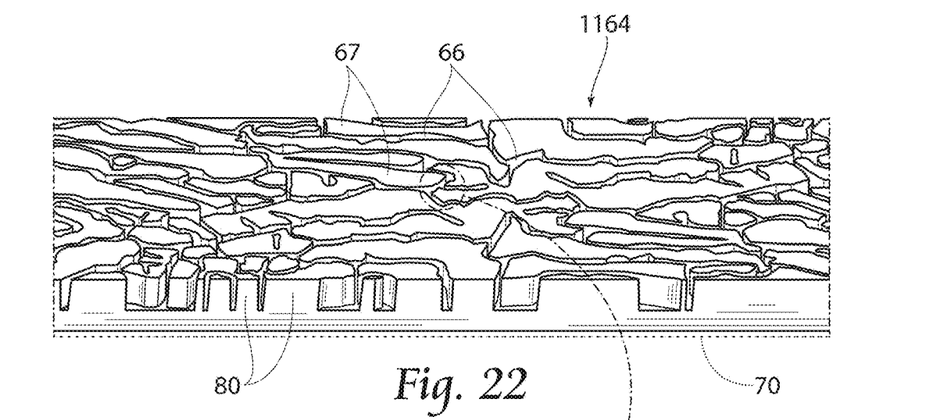
FIG. 22 is a top perspective view of a camouflage applique which can take the form of a wrap, an adhesive wrap, or a structure.
Figure 22A:
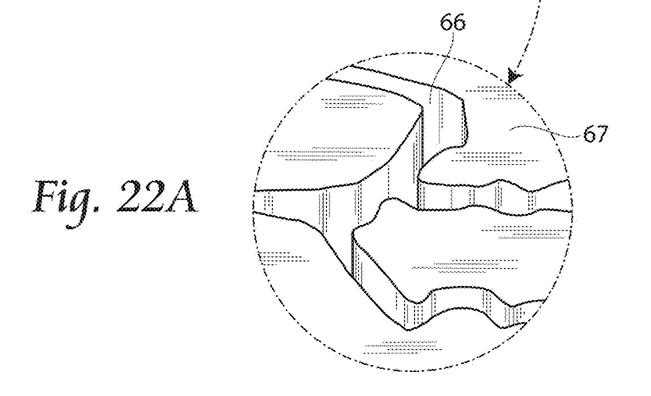
FIG. 22A is a closeup of an exemplary portion of a pattern of FIG. 22.

Referring now to FIG. 22 a top perspective view of a camouflage sheet 1164 is shown, which in this embodiment can take the form of a wrap or sheet, an adhesive wrap, or a panel structure. As previously mentioned, grooves 66 and top surfaces 67 provide the desired camouflaging effect, and can take any of the forms previously described. Optionally, an adhesive structure 70 can be provided to a surface of sheet 1164, and further optionally, adhesive structure 70 contains an adhesive layer and a cover sheet or release paper layer. Sidewalls 80 of sheet 1164 can be vertical, such that two adjacent panels 1164 can be positioned next to one another to form a continuous pattern of grooves 66 and top surfaces 67. As shown in FIG. 22A, the sidewalls of grooves 66 can be vertical. Sheet 1164 can be applied to any surface. It is contemplated that the sheet 1164 can be applied to boots, coolers, storage containers, cameras, tree stands, quivers, bow risers, backpacks, clothing, phones, phone cases, climbing sticks, ladders, ornamentally, etc.

Figure 22B:
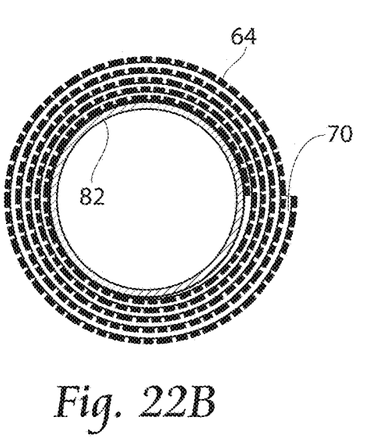
FIG. 22B is side view of a rolled up camouflage material such as a material of FIG. 22.
Figure 23:
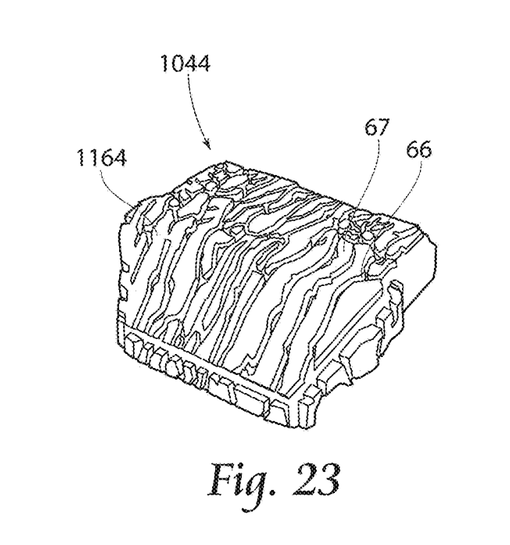
FIG. 23 is a top perspective view of a camera housing roof camouflage component.

As shown in FIG. 22B, sheet 1164 can be provided in rolled up fashion about a core 82, and then placed where desired by the user. For instance, portions of panel 1164 can be severed and placed about an existing lid or cover 1044 as shown in FIG. 23.

Figures 24, 25, 26:
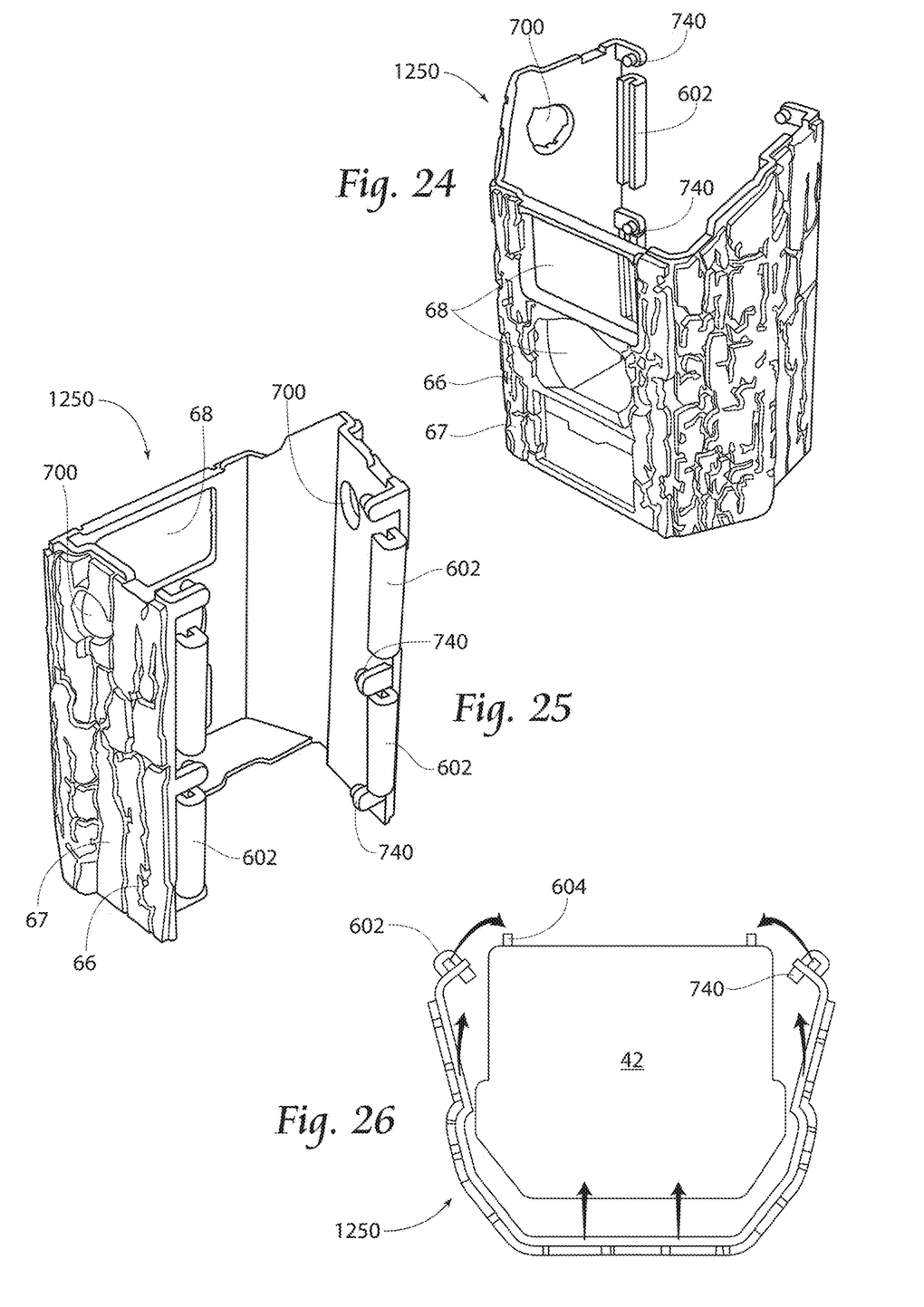
FIG. 24 is a top perspective view of a camera housing wall camouflage component.
FIG. 25 is a rear perspective view of a camera housing wall camouflage component.
FIG. 26 is a top view of a camera housing wall camouflage component during installation onto a camera housing.

Referring now to FIG. 24-26, a top perspective view of a camera housing wall camouflage component or skin 1250 is shown. In this embodiment, a skin female receiver slot 602 is provided to mate with a male tab 604 on housing 42 as shown in FIG. 26. Additionally, insert tabs 740 can be provided to form a securing wrap about housing 42 when inserted into tab receivers on housing 42 (not shown).

Figure 27:
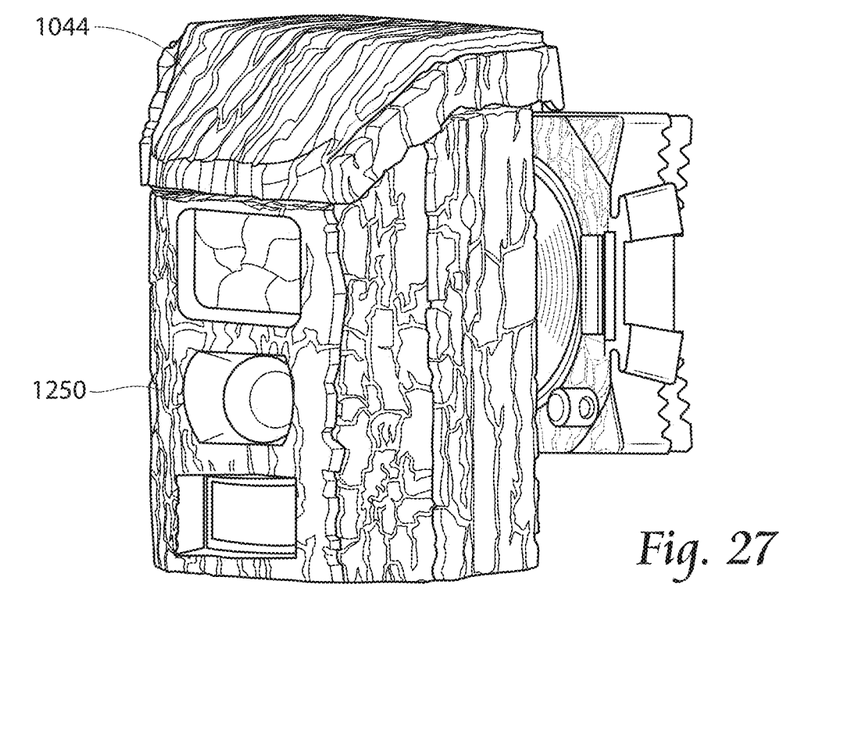
FIG. 27 is a front perspective view of an alternate embodiment of a camera camouflaging system having a camera skin provided as part of a camera enclosing structure.
Figure 28:
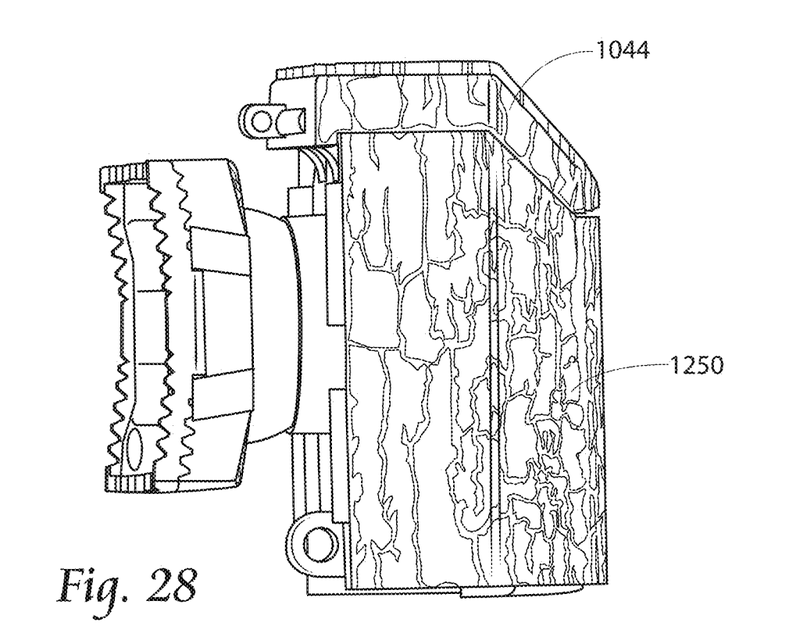
FIG. 28 is a side view of the camouflaging system of FIG. 27.

When installed by stretching or flexing in the directions shown by the direction of the arrows in FIG. 26, skin 1250 and lid or cover 1044 provide concealment for the parts underlying them, as shown in perspective in FIG. 27, and from the side in FIG. 28.

Figure 29:
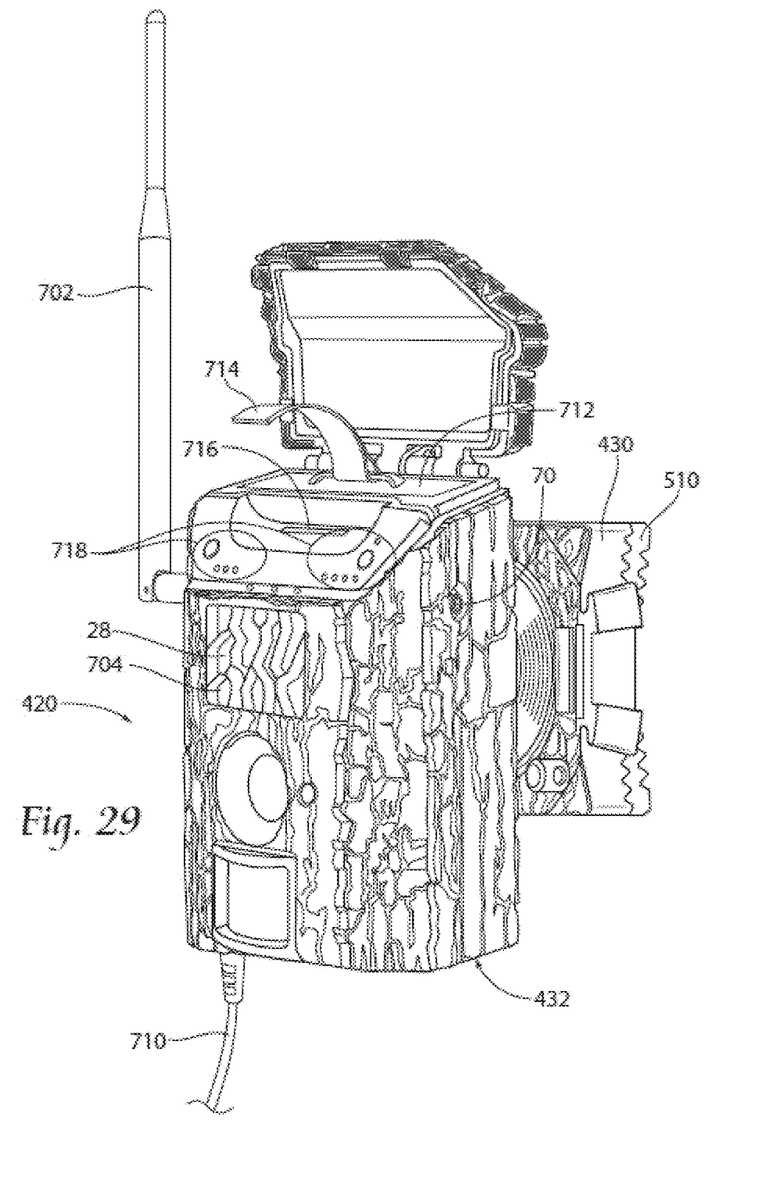
FIG. 29 is a side perspective view of an in-use camera mount and camera.
Figures 30, 31:
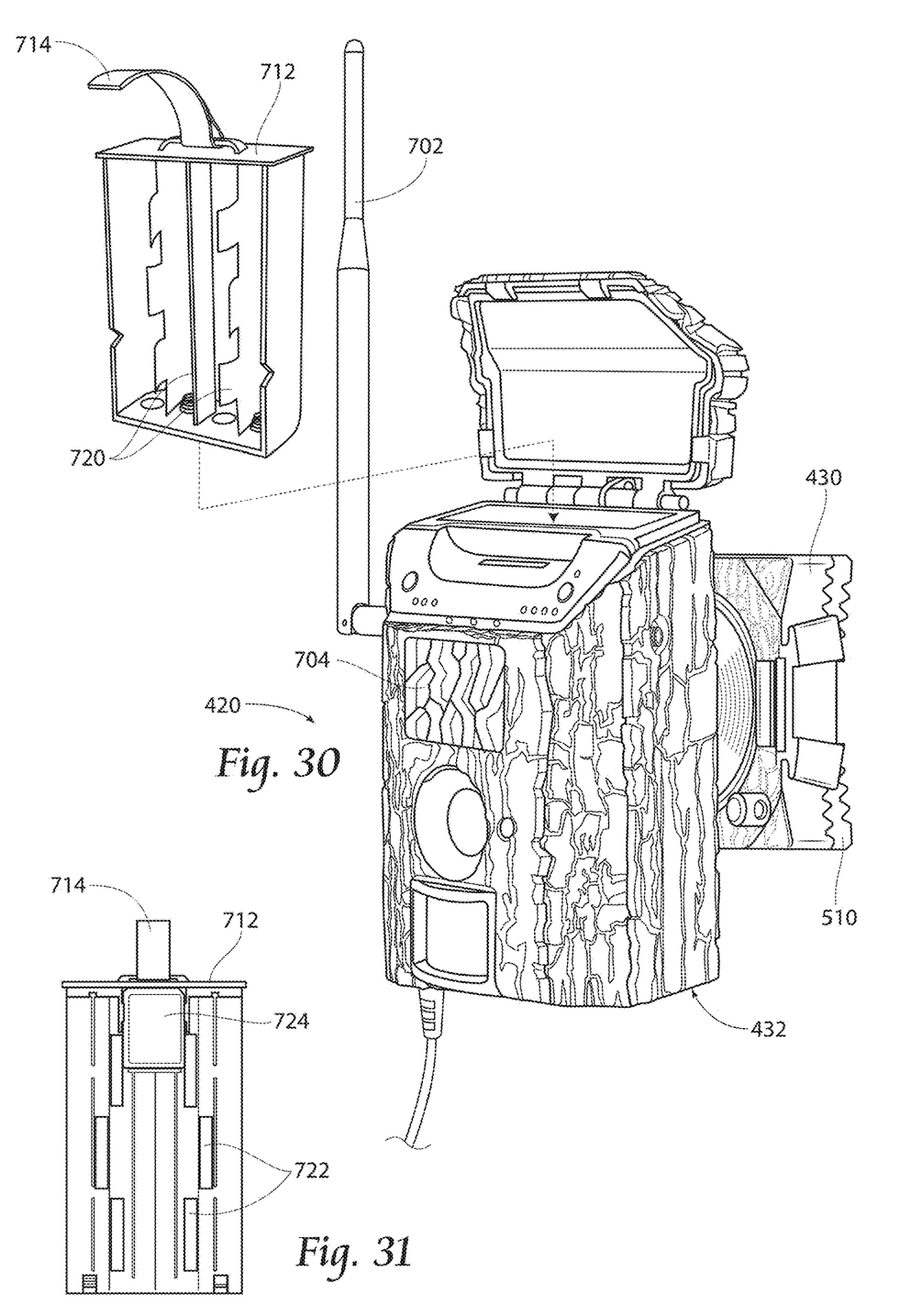
FIG. 30 is the camera of FIG. 29, with a battery pack removed from a top side of the camera under a hinged lid.
FIG. 31 is a rear view of the battery pack of FIG. 30.

Referring now to FIG. 29, a side perspective view of an in-use camera mount 420 is shown. An antenna 702 is supplied if cellular or other data transmission is desired. Shadow casting bars 704 are optionally applied over windows 28. A data cable 710 can enter housing 420 through a port. A battery box 712 is slidably removed, preferably from a top of the camera, and pull strap 714 is provided for this purpose. Data card slot 716 is preferably top accessible, as are command buttons 718. Referring now to FIG. 29, battery pack 712 can be slidably removed from a top side of the camera under a hinged lid. Divider walls 720 compartmentalize batteries, and on a back side of the battery box 712, a spare cart holder and card 724 is provided as shown in FIG. 31. Battery pop out slots 722 facilitate battery changeouts.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A camera camouflage comprising:
   a camera skin for covering a camera having a front carrying a lens and a top facing surface, said camera skin comprising:
   a panel to cover a front face of the camera, the panel having an inner face to face the camera and an outer face, the outer face comprising:
   an irregular pattern of grooves simulating grooves of a tree bark; and
   an opening to be aligned with a lens of a camera when the skin is coupled to the camera;
   a hinged camera skin top surface selectively positioned between an open position and a closed position, said camera skin top surface selectively covering said camera top facing surface, wherein a hinge connecting said camera skin and said top facing surface, wherein said hinge permits said top facing surface to flip open while said camera skin stays in place.

2. The camera camouflage of claim 1, wherein the grooves comprise a first groove, a second groove obliquely branching off the first groove and a third groove obliquely branching off the first groove.

3. The camera camouflage of claim 2, wherein the first groove has a first varying depth, wherein the second groove has a second varying depth and wherein the third groove has a third varying depth.

4. The camera camouflage of claim 3, wherein the first varying depth as a first maximum depth and wherein the second varying depth has a second maximum depth different than the first maximum depth.

5. The camera camouflage of claim 3, wherein the first varying depth has a first minimum depth and the second varying depth has a second minimum depth different than the first minimum depth.

6. The camera camouflage of claim 1, wherein the grooves comprise a first groove having a first depth and a second groove having a second depth different than the first depth.

7. The camera camouflage of claim 6, wherein the first groove is connected to the second groove.

8. The camera camouflage of claim 1, herein the outer face comprises a first surface at a top of the grooves and a second surface at the top of the grooves, first surface having a first color and the second surface having a second color different than the first color.

9. The camera camouflage of claim 1, wherein the outer face comprises a first surface at a top of the grooves and a second surface at the top of the grooves, wherein the first surface is spaced by a first distance from a first portion of the inner face that is opposite the first surface and wherein the second surface is spaced by second distance different than the first distance from a second portion of the inner face that is opposite the second surface.

10. The camera camouflage of claim 1, wherein the skin is compressible.

11. The camera camouflage of claim 1, and the skin is funned from a rubber or rubber-like material.

12. The camera camouflage of claim 1, wherein the opening extends through a floor of one of the grooves.

13. The camera camouflage of claim 12, wherein the floor about the opening s recessed at least ⅛ of an inch from the top of said one of the 3 grooves.

14. The camera camouflage of claim 12, wherein the floor about the opening is recessed at least ¼ of an inch from the top of said one of the grooves.

15. The camera camouflage of claim 1, wherein the grooves comprise a first interior side wall and a second interior side wall facing the first interior side wall and extending nonparallel to the first interior side wall.

16. The camera camouflage of claim 15, wherein the first interior side wall and the second interior side wall extend oblique to one another in a direction parallel to the inner face.

17. The camera camouflage of claim 15, wherein the first interior side wall and the second interior side wall extend oblique to one another in a direction perpendicular to the inner face.

18. The camera camouflage of claim 15, wherein the first interior si wall and the second interior side wall extend oblique to one another in a direction parallel to the interface and in a direction perpendicular to the inner face.

19. The camera camouflage of claim 1, wherein the grooves comprise a groove having a floor, a top surface extending from a top of the groove and an interior side wall extending from the floor to the top surface, the interior side wall extending oblique to the top surface and oblique to the floor.

20. The camera camouflage of claim 1, wherein the outer face has a curved convex profile.

21. The camera camouflage of claim 20, wherein the inner face has a flat planar profile opposite the outer face.

22. The camera camouflage of claim 1, wherein the skin is selectively coupled to the camera.

23. The camera camouflage of claim 22 further comprising:
   a second camera skin forming a kit of interchangeable skins for the camera, the second camera skin comprising:
   a second panel to cover the front face of the camera, the second panel having a second inner face to face the camera and a second outer face, the second outer face comprising:

a second irregular pattern of second grooves simulating grooves of a second tree bark; and a second opening to be aligned with the lens of the camera when the second skin is coupled to the camera.

24. The camera camouflage of claim 23, the second irregular pattern is different than the irregular pattern.

25. The camera camouflage of claim 23, wherein at least one of the grooves of the irregular pattern is different than at least one of the grooves of the second irregular pattern.

26. The camera camouflage of claim 23, wherein said at least one of the grooves of the irregular pattern has a different depth than saidat least one of the grooves of the second irregular pattern.

27. The camera camouflage of claim 23, wherein said at least one of the grooves of the irregular pattern has a different maximum width than said at least one of the grooves of the second irregular pattern.

28. The camera camouflage of claim 23, wherein said at least one of the grooves of the irregular pattern has a different maximum depth then said at least one of the grooves of the second irregular pattern.

29. The camera camouflage of claim 23, wherein the camera skin has a first set of colors and wherein the second camera skin a second set of colors different than the first set.

30. The camera camouflage of claim 23, wherein the grooves of the camera skin have a first average spacing therebetween and wherein the second grooves of the second camera skin have a second average spacing less than the first average spacing.

31. The camera camouflage of claim 23, wherein the outer surface of the skin has a first curved convex profile and wherein the second outer surface of the secon skin has a second curved convex profile different than the first curved convex profile.

32. The camera camouflage of claim 23, wherein the second grooves comprise a first interior side wall and a second interior side wall facing the first interior side wall and extending nonparallel to the first interior side wall.

33. The camera camouflage of claim 1 further comprising the camera, wherein the camera skin is over molded about a housing of the camera.

* * * * *

UNITED STATES PATENT AND TRADEMARK OFFICE
CERTIFICATE OF CORRECTION

PATENT NO. : 10,687,524 B2  
APPLICATION NO. : 16/243727  
DATED : June 23, 2020  
INVENTOR(S) : Andrae T. D'Acquisto Page 1 of 1

It is certified that error appears in the above-identified patent and that said Letters Patent is hereby corrected as shown below:

In the Claims

| | |
|---|---|
| Claim 8, Line 1 | Delete "herein" and insert -- wherein -- |
| Claim 11, Line 2 | Delete "funned" and insert -- formed -- |
| Claim 13, Line 2 | After "opening", delete "s" and insert -- is -- |
| Claim 18, Line 2 | Delete "si" and insert -- side -- |
| Claim 29, Line 3 | Before "second" insert -- has -- |
| Claim 31, Line 3 | Delete "secon" and insert -- second -- |

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*